United States Patent Office 3,814,736
Patented June 4, 1974

3,814,736
POLYURETHANE PREPOLYMERS HAVING IMPROVED STABILITY AND METHOD FOR THEIR PREPARATION
Alain Gibier-Rambaud, Chemin des Esperelles, and Bernard Blanc, Bd Gerard Philippe, both of 13-Martigues, France
No Drawing. Continuation of abandoned application Ser. No. 57,336, July 22, 1970. This application Feb. 1, 1973, Ser. No. 328,711
Claims priority, application France, July 25, 1969, 6925423
Int. Cl. C08g 22/44
U.S. Cl. 260—77.5 AC 9 Claims

ABSTRACT OF THE DISCLOSURE

Polyurethane prepolymers prepared by the reaction of polyhydroxylated compounds with an excess of organic polyisocyanates in which prior to the admixture of the polyhydroxylated compounds with the polyisocyanates, the former is subjected to a dehydration to reduce the residual water content to less than 5000 and preferably less than 500 p.p.m. and a small amount of a highly hydrolyzable compound such as the chloride of boron, aluminum, titanium and silicon is added and in which the composition may include various adjuvants such as fillers, pigments, coloring agents and solvents which are dehydrated prior to admixture.

---

This is a continuation of application Ser. No. 57,336, filed July 22, 1970 and now abandoned.

This invention relates to polyurethane prepolymers which are ready for use, which have good stability in storage and which can be hardened by the moisture in air.

Polyurethane prepolymers, formed by reaction of organic polyisocyanates with an amount of polyhydroxylated compounds less than that theoretically required for reaction with all of the isocyanate functions, can be used in various compositions, such as varnishes, coating resins, adhesives and bonding primers. In order to reduce the time for hardening, it is desirable to formulate the compositions to include catalysts that promote crosslinking of the isocyanate functions, such as highly active organo metallic or tertiary amine type catalysts.

Various adjuvants are also frequently included, such as fillers, pigments, coloring agents and solvents. In practice, the catalysts and the adjuvants substances are incorporated into the composition immediately prior to use because such components, and particularly the catalysts, render the compositions unstable and incapable of storage over a long period of time.

It is an object of this invention to produce and to provide a method for producing polyurethane prepolymers which are capable of being stored over long periods of time, even in the presence of active catalysts, and in which the composition may also contain various of the adjuvants, such as fillers, pigments, coloring agents and solvents.

In accordance with the practice of this invention, such compositions, based upon polyurethane prepolymers, are prepared from polyhydroxylated compounds which are first subjected to dehydration and into which small amounts of halogenated compounds which rapidly hydrolyze are introduced, and then the organic polyisocyanates in amounts greater than the theoretical amount for reaction with the hydroxyl functions of the polyhydroxylated compounds and cross-linking catalysts of the type which actively promote the reaction of the isocyanate functions with compounds having labile hydrogen groups are added.

If desired, additions of dehydrated adjuvant compounds, such as fillers, pigments, coloring agents and/or solvents, are added, preferably by admixture with the polyhydroxylated compounds, before introduction of the highly hydrolyzable halogenated compounds.

It has been found that compositions embodying the features of this invention, even though they contain highly active catalysts, can be stored for long periods of time without gelling of the prepolymer, as compared to conventional polyurethane prepolymers which gel rapidly, especially in the presence of highly active catalysts.

A wide variety of polyhydroxylated compounds can be used in the preparation of the compositions of this invention and, in particular, use can be made of polyether polyols produced by the condensation of alkylene oxides such as ethylene oxide, propylene oxide, or tetrahydrofuran, either alone, in mixtures or in sequence, on polyols such as glycols, polyglycols, glycerols, trimethylolpropane, pentaerythritol or sorbitol.

The polyhydroxylated compounds are subjected to a preliminary dehydration treatment, preferably by a physical method, such as treatment under vacuum at a temperature of the order of about 100° C., until the proportion of residual water, determined for example in accordance with the Karl Fischer method, is less than 5000 parts by weight per million (p.p.m.).

Very small amounts of highly hydrolyzable compounds, preferably selected from the chlorides of boron, aluminum, titanium, and silicon, are incorporated into the polyhydroxylated compounds after the dehydration treatment. Very small amounts of such halogenated compounds are sufficient, usually less than 5000 p.p.m. and preferably about 100 p.p.m., but generally more than above 25 p.p.m. with respect to the prepolymer.

Organic polyisocyanates admixed with the prepared polyhydroxylated compounds can be selected from aliphatic polyisocyanates, such as hexamethylene diisocyanate, or from aromatic polyisocyanates, preferably of low volatility, such as the polymethylene-polyphenyl-isocyanates (PAPI), the diphenylmethane-4,4'-diisocyanate (MDI), or hydrogenated derivatives of the latter. Use is made of an excess of organic polyisocyanates with respect to the polyhydroxylated compounds, such that the proportion by weight of free isocyanate functions in the prepolymer is preferably in the range of 15% to 30%. The organic polyisocyanates are reacted with the polyhydroxylated compound, as for example at a temperature within the range of 50° to 100° C., with constant agitation, for a few hours. Cross-linking catalysts which very actively promote the reaction of the isocyanate functions with compounds having mobile hydrogen atoms are then introduced into the compositions. Many catalysts of the type described are known, in particular organometallic compounds, tertiary amines, compounds of heavy or transition metals, metal salts and metal esters. As catalysts, it is preferred to make use of organo-metallic compounds, such as dilaurate of dibutyl-tin and/or tertiary amines such as dimethylethanolamine.

The amounts of catalysts may vary, depending upon the proportion by weight of free isocyanate functions in the prepolymer, and also the rapidity at which it is desired that the composition should be cross-linked. Thus, for example, for certain types of bonding primers having a very rapid setting time of the order of about 5 minutes, the amount of catalyst may be as high as 1% by weight with respect to the primer.

It may be desirable to incorporate various adjuvant substances into the compositions of this invention, depending upon the use to be made of the compositions. Thus, for producing bonding primers which are capable of being applied in thin layers, the prepolymer is preferably diluted by means of one or more anhydrous solvents in amounts whereby the prepolymer will be 15% to 30% by weight of the total composition. It is preferred to make use of solvents which have low polarity, characterized by a dipolar moment in the liquid state of less than 2.5 debyes and in particular halogenated solvents, such as chlorinated and/or fluorinated derivatives of methane or ethane (such as the freons), or esters such as ethyl acetate. It has been found that the storage capacity of compositions of this invention, even in an air-proof and moisture-proof environment, improves with the decrease in the polarity of the solvents used. It was found, however, that it was possible to obtain compositions having good storage capacity with solvents having a dipolar moment greater than 2.5 debyes, and more particularly with acetone and methylethyl ketone, provided that these ketones were associated with catalysts of the organometallic type, such as dilaurate of dibutyl-tin.

The solvent components are also selected in accordance with their volatility, depending upon the uses of the compositions. Thus, for use on a building site in the building industry, solvents which evaporate in less than one-half hour are used. In other instances in which the organization of work requires longer operating cycles or in which the compositions are applied at temperatures above ambient temperature, solvents are used which evaporate in a few hours, such as ethylglycol acetate and butylglycol acetate.

The solvents used should be inert with respect to the free isocyanate functions of the polyurethane prepolymers and consequently should not contain, for example, functions with mobile hydrogen, such as alcohol functions.

Surface active agents can also be introduced into the compositions to facilitate spreading, in particular, cellulose acetate.

For certain uses, particularly as varnishes and coating resins, it is desirable also to introduce coloring agents, fillers and pigments of conventional types. Such fillers and pigments are incorporated into the composition of this invention, preferably after they have been subjected to a dehydration treatment, such as by preliminary distillation of the solvent containing the coloring agents, fillers and/or pigments.

The compositions of this invention can be stored for periods of several months and longer, directly in forms ready for use.

These compositions can be used in widely varying applications. In particular, they form highly effective primers for the purpose of promoting the bonding of plastics or elastic materials to carriers or for the purpose of protecting metals from corrosion. Such carriers can be of varying natures including, in particular, concrete, cement, plaster, sandstone, earthen-ware, porcelain, glass, ceramics, ferrous alloys, light alloys and plastic materials such as polyester resins.

The plastics or elastic substances whose adhesion to the carriers is improved by the bonding primers also vary quite broadly. In addition to mastics, foams, glues and polyurethane based paints, it is also possible to use substances based upon silicones, epoxy resin, polyeters, polyamides and polyvinyl chloride resins.

The bonding primers can be applied in conventional manner, and particularly with a brush, pad, paint brush or by spray gun, using as small an amount as possible. In an alternative form, the bonding primer can also be applied by spraying from an aerosol composition in which the fluid propellant functions also as a solvent for the polyurethane prepolymer.

Other compositions of the invention can form varnishes, such as for the finishing of leather, to protect parquet or cement floors, to protect metals and for various uses in ship-building and in the electrical industries. These varnishes can be applied to carriers of various natures as in the case of the bonding primers.

Other compositions which also contain fillers, coloring agents, and/or pigments, form coating resins which are ready for use and which can be applied to various substrates, such as cloth made of natural or synthetic fibers, cardboard, leather or plastic foams.

The following examples are given by way of illustration, and not by way of limitation:

EXAMPLE 1

This example relates to a composition of this invention which can be used as a bonding primer.

Preparation of the bonding primer

A polyoxypropylene glycol having a molecular weight of approximately 2000 is dried for two hours at 80° C. under an absolute pressure of 20 mm. Hg. After cooling to 30° C., a water content of 110 p.p.m. is determined by the Karl Fischer method. 250 p.p.m. of aluminum trichloride in molar solution in petrol is introduced rapidly and with vigorous agitation. After 10 minutes, 1.25 parts by weight of crude diphenylmethane-diisocyanate (MDI) per part of polyoxypropylene glycol is added. The mixture is heated to 70° C. and is kept at this temperature for two hours. A prepolymer, containing 15.6% by weight of polyisocyanate functions, is obtained. The production of the bonding primer is concluded by preparing a 20% by weight solution of the prepolymer in 1,1-dichloroethane which has been pre-dried on a molecular sieve and which contains 80 p.p.m. of water, and by adding thereto 0.5% by weight of dilaurate of dibutyl-tin and 0.5% by weight of dimethylethanolamine, based upon the weight of the prepolymer. This bonding primer can be stored without any gelling of the prepolymer or any deposit being formed.

Application of the bonding primer prepared in Example 1

The bonding primer prepared in Example 1 is applied with a brush to traction test pieces made of aluminum which have been cleaned and degreased with trichloroethylene. After 10 minutes, a polyurethane mastic is poured onto the test pieces. Traction tests are carried out after 14 days and rupture of the polyurethane mastic itself (cohesive rupture) is observed with a traction force of 10.5 bars.

The bonding primer prepared in Example 1 is applied by a gun, in series, to glass plates which have been degreased with perchloroethylene and cleaned of dust. After 10 minutes, the glass plates are placed on stonework supports coated with a polyurethane mastic in order to form laboratory articles.

EXAMPLE 2

This example is concerned with the composition of this invention which can be used as a bonding primer.

Preparation of the bonding primer

A polyether-hexol, having a molecular weight of 1200, produced by the condensation of propylene oxide on sorbitol, is dried for 3 hours at 100° C. under an absolute pressure of 20 mm. Hg. After cooling to 30° C., a water content of 250 p.p.m. is determined by the Karl Fischer method. An amount of $SiCl_4$ corresponding to 400 p.p.m. with respect to the prepolymer is introduced rapidly and with vigorous agitation, followed 5 minutes later by an amount of polyphenylene polyisocyanate (PAPI) such that the molecular ratio of the isocyanate functions to the hydroxyl functions of the polyether-polyol is 20. The mixture is heated and maintained at 70° C. for 2 hours. A prepolymer is obtained which contains 27.6% by weight free isocyanate functions. A solution is then prepared containing 20% by weight of the prepolymer in ethyl acetate which has previously been dried by rectification and which contains 80 p.p.m. of water, and 0.4% by weight of dilaurate of dibutyl-tin is introduced.

After storage for 3 months, the proportion by weight of free isocyanate functions has remained unchanged (27.5% by weight with respect to the dry extract).

Applications of the bonding primer prepared in Example 2

The bonding primer prepared in Example 2 is applied with a brush to the ends of concrete members between which a sealing joint is to be located. After 10 minutes, and without having to remove the scaffolding, the joint formed by a silicone mastic is applied. 15 days later, the excellent degree of adhesion of the mastic can be verified by pulling on the lips of the joint and no tendency to separate is indicated.

EXAMPLE 3

This example is concerned with a composition which can be used as a varnish for finishing leather.

A polyoxypropylene-triol is used, having a mean molecular weight of 3000 and which is dehydrated by heating under vacuum at 120° C. for 3 hours, at a residual pressure of 20 mm. Hg. The residual water content of 80 p.p.m. is determined by the Fischer method. 150 p.p.m. of $TiCl_4$ in molar solution in petrol is introduced with vigorous agitation into the dehydrated polyether-triol. 15 minutes afterwards, crude diphenylmethane-4,4'-diisocyanate is added such that the $$\frac{NCO}{OH}$$

ratio is 5.3. The ingredients are heated for 3 hours at 70° C. to yield a prepolymer A.

Butyl acetate, ethyl acetate and ethyl glycol acetate are separately dehydrated by azeotropic distillation until their water content is not more than 20 to 30 p.p.m.

The following composition is then made:

| | Parts by weight |
|---|---|
| Prepolymer A | 35 |
| Dehydrated butyl acetate | 10 |
| Dehydrated ethyl acetate | 32.6 |
| Dehydrated ethylglycol acetate | 20 |
| Aniline black | 1 |
| Cellulose acetobutyrate | 0.5 |
| Dilaurate of dibutyl-tin | 0.5 |
| Dimethylethanolamine | 0.4 |
| | 100 |

A varnish which is ready to be applied and which contains 9% of free NCO is obtained. This varnish is storage-stable. It can be applied, for example, by means of a gun to skins which have previously been dressed. It dries in 3 minutes at a temperature of 65° C.

It will be apparent from the foregoing that we have provided a new and improved polyurethane prepolymer composition which has greater storage life and which remains substantially free of gelling and which has a wide variety of effective utilizations.

It will be understood that changes may be made in the details of formulation and operation as well as use, without departing from the spirit of the invention, especially as defined in the following claims.

We claim:

1. In the method of preparing polyurethane prepolymers by reaction of polyhydroxylated compounds with an excess of organic polyisocyanates, the improvement comprising subjecting the polyhydroxylated compounds to a preliminary dehydration treatment to reduce the water content to less than 5000 p.p.m., adding 25 to 5000 p.p.m. of a highly hydrolyzable halogenated compound selected from the group consisting of halides of boron, aluminum, titanium and silicon, based upon the weight of the prepolymer, and adding the organic polyisocyanate in an amount greater than the amount which theoretically reacts with the hydroxyl functions of the polyhydroxylated compounds, and a cross-linking catalyst which actively promotes the reaction of the isocyanate functions with compounds having a mobile hydrogen.

2. The method as claimed in claim 1 in which the polyhydroxylated compounds are dehydrated to a residual water content of less than 500 p.p.m.

3. The method as claimed in claim 1 in which the metal chloride is present in an amount of about 100 p.p.m. with respect to the prepolymer.

4. The method as claimed in claim 1 in which the cross-linking catalyst is selected from the group consisting of an organo-metallic derivative of tin and a tertiary amine.

5. An industrial product comprising the polyurethane prepolymer composition prepared by the method of claim 1.

6. An industrial product as claimed in claim 5 in which the prepolymer composition contains one or more adjuvants selected from the group consisting of solvents, fillers, pigments and coloring agents.

7. An industrial product as claimed in claim 6 in which the added adjuvants are anhydrous and free of functions which are reactive with respect to the polyisocyanates.

8. An industrial product as claimed in claim 7 in which the adjuvant is a solvent having a dipolar moment in the liquid state of less than 2.5 Debyes.

9. The method as claimed in claim 1 in which the hydrolyzable halogenated compound is a chloride.

References Cited

UNITED STATES PATENTS

| 3,380,950 | 4/1968 | Blomeyer | 260—31.2 |
| 3,479,325 | 11/1969 | Blomeyer et al. | 260—77.5 |
| 2,929,800 | 3/1960 | Hill | 260—77.5 |
| 3,652,506 | 3/1972 | Gibier-Rambaud et al. | 260-77.5 AB |
| 3,723,394 | 3/1973 | Gibier-Rambaud et al. | 260-77.5 AB |

FOREIGN PATENTS

| 1,170,627 | 5/1964 | Germany | 260—77.5 |

OTHER REFERENCES

Weissberger (ed.), Technique of Organic Chemistry, vol. III, Part I, Interscience, New York, 1956, pp. 811–817.

Bloomeyer et al., Chem. Abstracts, vol. 61, 1964, pp. 4559d and e (Abstr. of Ger. 1,170,627).

Saunders et al., Polyurethanes, Part II, Interscience, New York, 1964, pp. 8, 9, 14, 15, 202, and 481.

M. J. WELSH, Primary Examiner

U.S. Cl. X.R.

117—132 B, 142; 260—77.5 AA, 77.5 AB

UNITED STATES PATENT OFFICE
CERTIFICATE OF CORRECTION

Patent No. 3,814,736   Dated June 4, 1974

Inventor(s) Alain Gibier-Rambaud et al.

It is certified that error appears in the above-identified patent and that said Letters Patent are hereby corrected as shown below:

In Column 1, after the listing of the inventors names, please insert -- Assignee: NAPHTACHIMIE, Paris, France --.

Signed and sealed this 12th day of November 1974.

(SEAL)
Attest:

McCOY M. GIBSON JR.                  C. MARSHALL DANN
Attesting Officer                 Commissioner of Patents